United States Patent
Wyles et al.

(10) Patent No.: US 9,635,287 B2
(45) Date of Patent: Apr. 25, 2017

(54) METHOD AND APPARATUS FOR INTEGRATED SENSOR TO PROVIDE HIGHER RESOLUTION, LOWER FRAME RATE AND LOWER RESOLUTION, HIGHER FRAME RATE IMAGERY SIMULTANEOUSLY

(75) Inventors: Richard H. Wyles, Santa Barbara, CA (US); James F. Asbrock, Oceanside, CA (US); Robert L. Cook, II, Plano, TX (US); Simeon Symeonidis, McKinney, TX (US)

(73) Assignee: Raytheon Company, Waltham, MA (US)

( * ) Notice: Subject to any disclaimer, the term of this patent is extended or adjusted under 35 U.S.C. 154(b) by 1003 days.

(21) Appl. No.: 13/270,557

(22) Filed: Oct. 11, 2011

(65) Prior Publication Data

US 2013/0088594 A1    Apr. 11, 2013

(51) Int. Cl.
*H04N 7/18* (2006.01)
*H04N 5/347* (2011.01)
*H04N 5/343* (2011.01)
*H04N 5/355* (2011.01)

(52) U.S. Cl.
CPC ............. *H04N 5/347* (2013.01); *H04N 5/343* (2013.01); *H04N 5/35563* (2013.01)

(58) Field of Classification Search
CPC ..... H04N 5/343; H04N 5/35563; H04N 5/347
USPC ........................................ 348/144, 148, 294
See application file for complete search history.

(56) References Cited

U.S. PATENT DOCUMENTS

| | | |
|---|---|---|
| 5,272,535 A | 12/1993 | Elabd |
| 5,808,350 A | 9/1998 | Jack et al. |
| 6,040,568 A | 3/2000 | Caulfield et al. |
| 6,587,001 B1 | 7/2003 | Wyles et al. |
| 6,649,913 B1 | 11/2003 | Kennedy et al. |
| 6,885,002 B1 * | 4/2005 | Finch et al. .................. 250/332 |
| 7,593,040 B2 | 9/2009 | Shan et al. |
| 2006/0239587 A1 * | 10/2006 | Sugiyama et al. ............ 382/284 |
| 2007/0125951 A1 * | 6/2007 | Snider et al. ............ 250/363.03 |
| 2010/0225679 A1 * | 9/2010 | Guncer ......................... 345/690 |
| 2013/0076910 A1 * | 3/2013 | Scott ............................. 348/164 |

FOREIGN PATENT DOCUMENTS

WO    WO 0051345 A1 *    8/2000
WO    WO 03/021687 A2    3/2003

OTHER PUBLICATIONS

Bub et al. "Temporal Pixel Multiplexing for simultaneous high-speed high-resolution imaging". Nat Methods, Mar. 2010, 7(3): 209-211, pp. 1-12.*
Charge-coupled device—Wikipedia, the free encyclopedia. Accessed Apr. 13, 2011.*

(Continued)

*Primary Examiner* — Zhihan Zhou
(74) *Attorney, Agent, or Firm* — Daly, Crowley, Mofford & Durkee, LLP

(57) ABSTRACT

Methods and apparatus to provide, from data from a single sensor, high-resolution imagery at a first frame rate, such as typical video frame rate, and lower-resolution imagery at a second frame rate, which is higher than the first rate. In one embodiment, the first frame rate data can be viewed by a user and the second frame rate data can be processed to identify an event of interest, such as pulsed light.

20 Claims, 5 Drawing Sheets

(56) References Cited

OTHER PUBLICATIONS

G. Yang, C. Sun, C. Wrigley, D. Stack, C. Kramer, B. Pain, "Dynamically Reconfigurable Imager for Real-Time Staring Vision Systems", Jet Propulsion Laboratory, California Institute of Technology, pp. L3-1-L3-4.
Extended European Search Report dated Sep. 27, 2013, Application No. 12187672.6-1902/2582131, 7 pages.
European Office Action dated Jan. 22, 2015 corresponding to European Patent Appl. No. 12187672.6; 3 Pages.
European Communication under Rule 71(3) EPC dated Jul. 9, 2015 corresponding to European Patent Application No. 12187672.6; 22 Pages.

* cited by examiner

METHOD AND APPARATUS FOR INTEGRATED SENSOR TO PROVIDE HIGHER RESOLUTION, LOWER FRAME RATE AND LOWER RESOLUTION, HIGHER FRAME RATE IMAGERY SIMULTANEOUSLY

BACKGROUND

As is known in the art, there are a wide variety of sensors for collecting many types of information. For example, video sensors can collect image information that can be used to detect predetermined objects, events, etc. However, conventional sensors typically collect data at a predetermined rate and resolution, thereby limiting the information that can be derived. To provide information in multiple formats, two sensor systems are typically required.

SUMMARY

The present invention provides methods and apparatus for a single sensor that simultaneously provides high-resolution imagery at a first frame rate, such as typical video frame rate, and lower-resolution imagery at a second frame rate, which is higher than the first rate. With this arrangement, in addition to image information for a user, predetermined events, such as pulsed light, can be identified by measuring the temporal characteristics of the image information. While exemplary embodiments of the invention are shown and described in conjunction with the detection of pulsed light associated with muzzle flashes, it is understood that embodiments of the invention are applicable to video applications in general in which it is desirable to identify relatively fast events.

In one aspect of the invention, a method of processing data from a sensor comprises processing data from a first pixel in a plurality of pixels at a first frequency by performing subframe averaging of the first pixel data over a first number of subframes to generate a first data stream at a first frame rate and a first resolution, outputting the first data stream for viewing by a user, aggregating the first pixel data with data from at least two neighboring pixels to form aggregate pixel data, integrating the aggregate pixel data on a first capacitor and outputting the integrated aggregate pixel data at a second frequency higher than the first frequency to generate a second data stream having a second resolution less than the first resolution and a second frame rate greater than the first frame rate.

The method can further include one or more of the following features: processing the second data stream to identify an event of interest, the event of interest is pulsing light, the event of interest is muzzle flash, integration times for the aggregate pixel data and the first pixel data are independently adjustable, the sensor is focal plan array, and/or the sensor is secured to a vehicle, the vehicle comprises a helicopter.

In another aspect of the invention, a sensor system comprises a first signal path circuit to process data from a first pixel in a plurality of pixels at a first frequency by performing subframe averaging of the first pixel data over a first number of subframes to generate a first data stream at a first frame rate and a first resolution, a first output to output the first data stream for viewing by a user, second signal path circuit to aggregate the first pixel data with data from at least two neighboring pixels to form aggregate pixel data and integrate the aggregate pixel data on a first capacitor, and a second output to output the integrated aggregate pixel data at a second frequency higher than the first frequency as a second data stream having a second resolution less than the first resolution and a second frame rate greater than the first frame rate.

The system can further include one or more of the following features: a processor to process the second data stream to identify an event of interest, the event of interest is pulsing light, the event of interest is muzzle flash, integration times for the aggregate pixel data and the first pixel data are independently adjustable, the sensor system comprises a focal plan array, the sensor system is secured to a vehicle, and/or the vehicle comprises a helicopter.

In a further aspect of the invention, a sensor system including a sensor to obtain data, comprises a first means to process data from a first pixel in a plurality of pixels to generate a first data stream at a first frame rate and a first resolution, a second means to aggregate the data from at least two neighboring pixels to form aggregate pixel data to generate a second data stream having a second resolution less than the first resolution and a second frame rate greater than the first frame rate. The sensor system can further include a third means to process the second data stream to identify an event of interest.

BRIEF DESCRIPTION OF THE DRAWINGS

The foregoing features of this invention, as well as the invention itself, may be more fully understood from the following description of the drawings in which.

DETAILED DESCRIPTION

Figure 1:
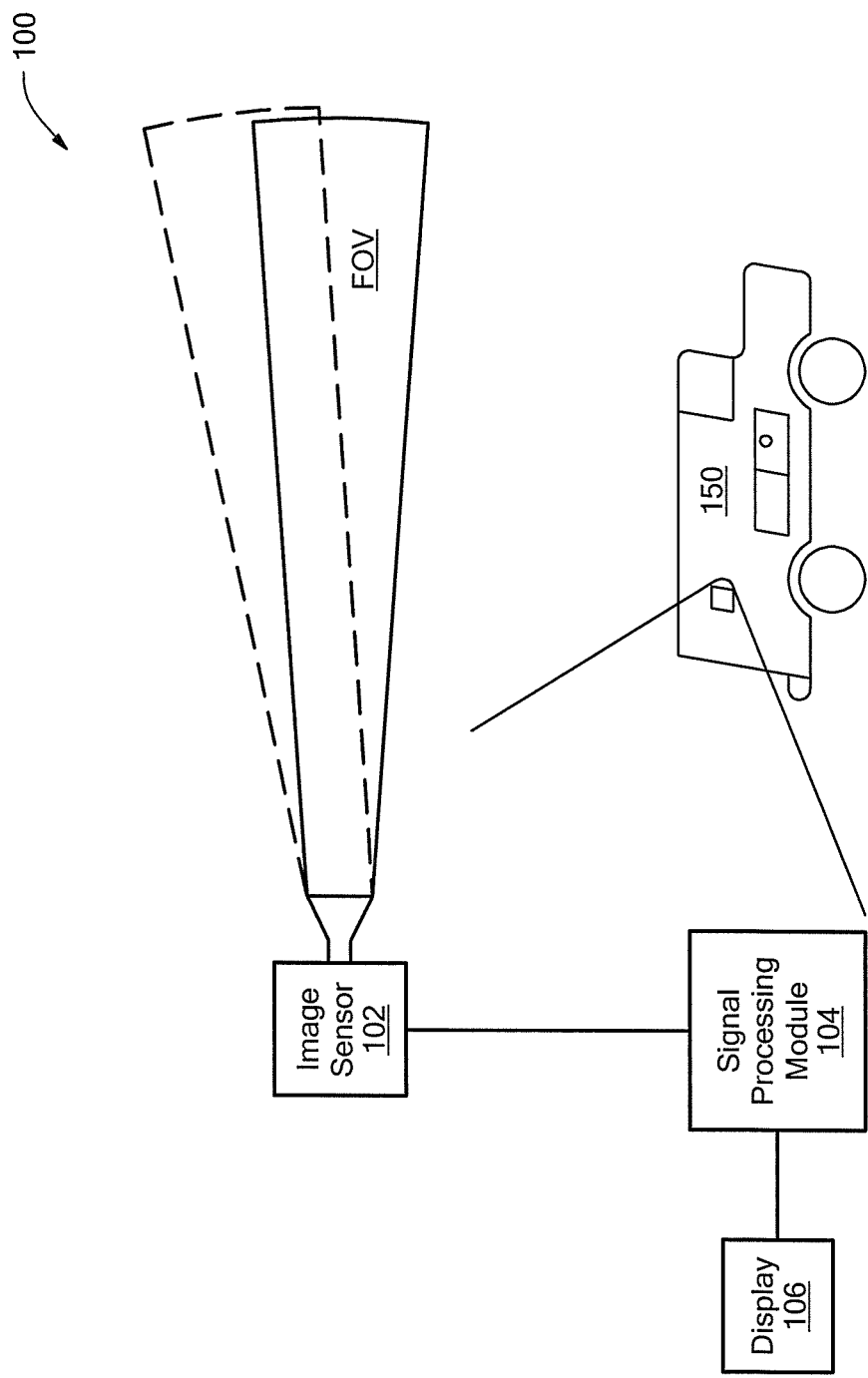
FIG. 1 is a schematic representation of an exemplary sensor system to detect events of interest in accordance with exemplary embodiments of the invention.

FIG. 1 shows a sensor system 100 having an image sensor 102 having a given field of view (FOV). The image sensor 102 collects image information for processing by a signal processing module 104 to provide video on a display 106 to facilitate identification of events of interest contained in the collected sensor information. In one embodiment, the sensor system 100 can be secured to a vehicle 150. In other embodiments, the sensor system 100 is disposed on a helicopter. It is understood that the sensor system 100 can be placed on any practical vehicle or stationary structure, or can be configured to be carried by a user.

As described more fully below, the sensor system 100 simultaneously provides high-resolution imagery at typical video frame rates, for example, as well as lower-resolution imagery at higher frame rates, such as the subframe rate. The higher frame rate video can be used to identify pulsed light, for example. In one embodiment, the sensor can detect weapons fire in a scene by measuring the temporal characteristics of relatively fast events, such as muzzle flashes. The normal frame rate video provides standard high-resolution scene imagery.

Figure 2:
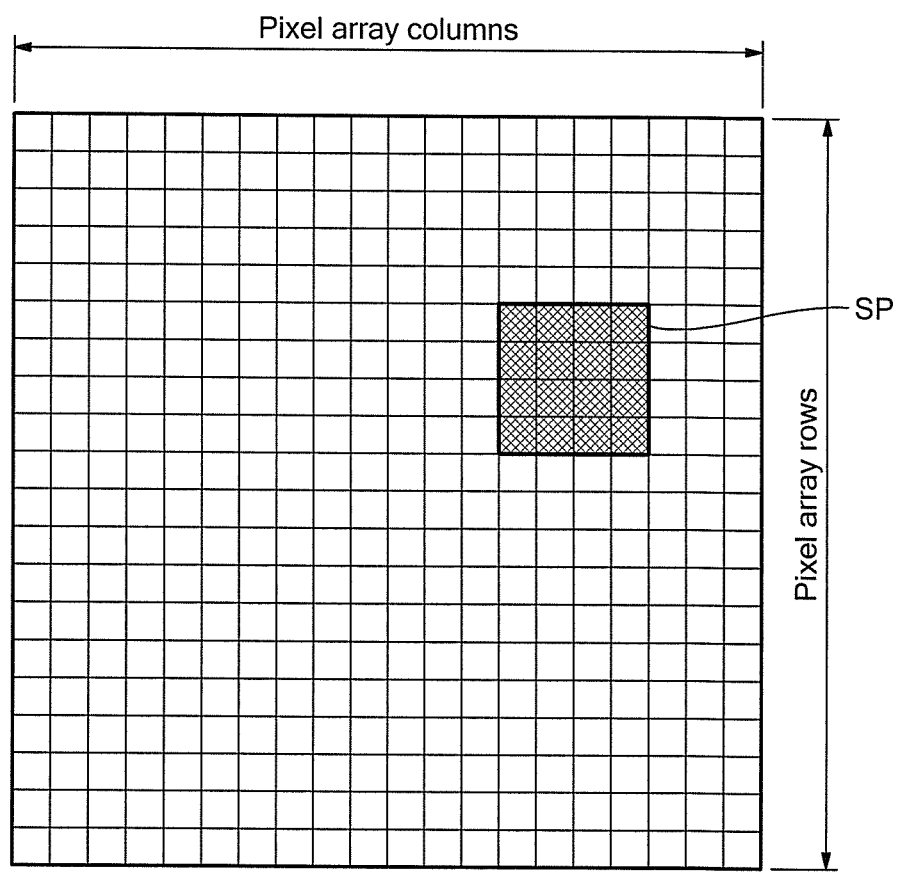
FIG. 2 is a schematic of an array having pixel aggregation.

It will be readily appreciated that any practical type of sensor capable of collecting pixel-based image information can be used. In one particular application, an electro-optical imaging sensor is used for infrared and/or visible-light imaging. The sensor includes an array of pixels, which can be arranged in columns and rows, as shown in FIG. 2. In one embodiment, information from neighboring pixels can be combined in order to reduce data rates. For example, a superpixel SP can be from a 4×4 aggregation of neighboring pixels. It is understood that any practical number of neighboring pixels can be used to meet the needs of a particular application.

In an exemplary embodiment, a sensor system includes a subframe averager (SFA) circuit for each pixel. The SFA circuit includes a switched capacitor, low-pass filter which improves performance by reducing noise. The SFA circuit operates at a relatively high rate, e.g., many times higher than typical video frame rates. In one particular embodiment, a sensor system includes a focal plan array (FPA) having a 1K by 1K array with a 30 Hz output and a 256 by 256 array of aggregated 4×4 pixel groups with a 600 Hz event indicator output, which is simultaneous with the 30 Hz output As known in the art, a focal-plane array (FPA) refers to an image sensing device comprising an array (typically rectangular) of light-sensing pixels at the focal plane of a lens. FPAs are commonly used for imaging purposes, e.g. taking pictures or video imagery, but can also be used for non-imaging purposes. FPAs operate by detecting photons at particular wavelengths and generating an electrical charge, voltage, or resistance in relation to the number of photons detected at each pixel. This charge, voltage, or resistance is measured, digitized, and used to construct an image of the object, scene, or phenomenon that emitted the photons.

Figure 3:
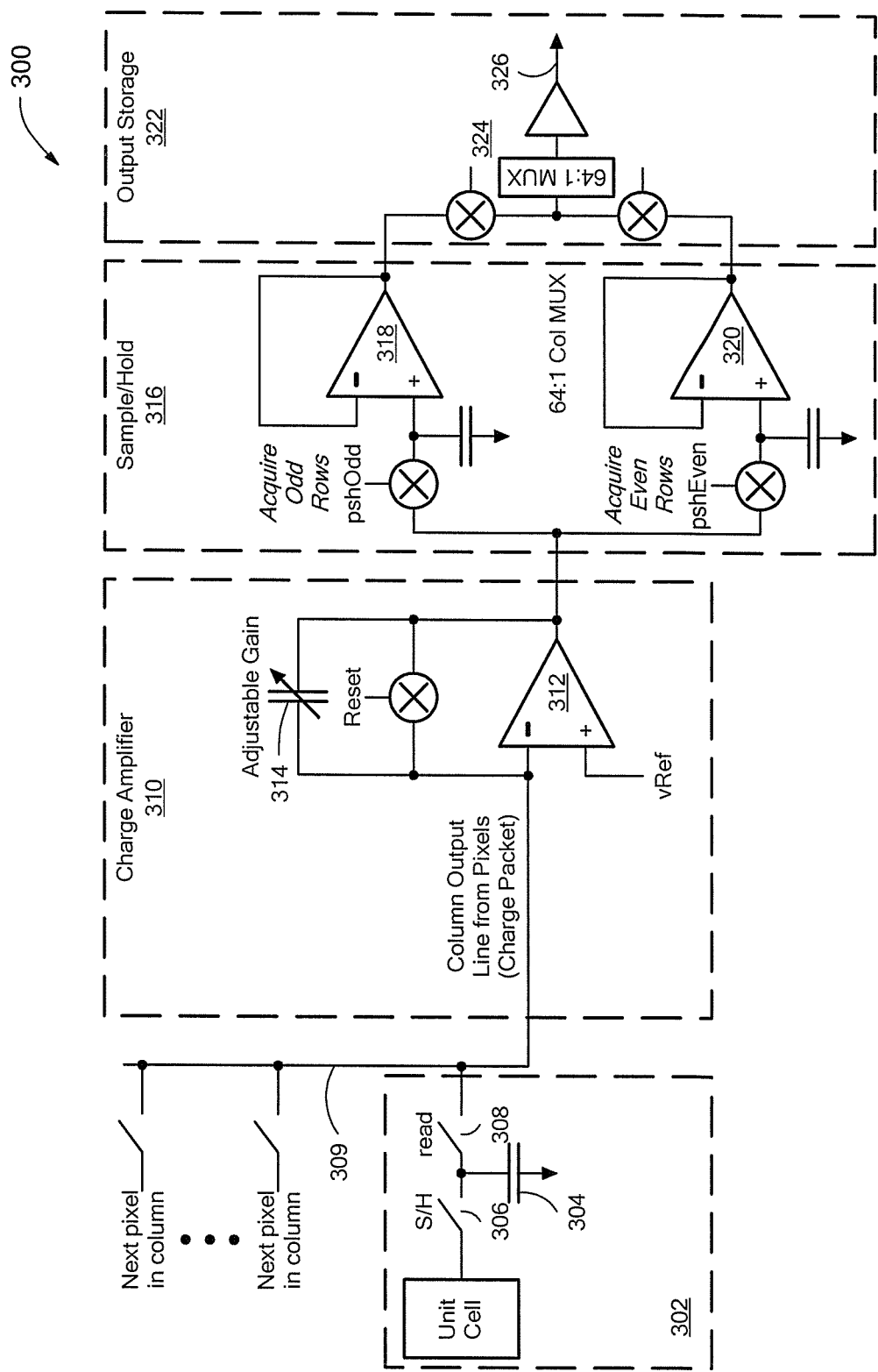
FIG. 3 is a schematic representation of an exemplary sensor signal path for reading out aggregated pixel data.

FIG. 3 shows an exemplary implementation of a focal plane array signal path 300 for reading out the aggregated pixel data in accordance with exemplary embodiments of the invention. An aggregated superpixel circuit 302 includes an aggregated integration capacitor 304 for a pixel group, such as a 4×4 group of neighboring pixels. Aggregation is done in the unit cell by merging integration capacitors for groups of neighboring pixels. In general, the aggregated integration capacitor 304 should be sized to prevent saturation. A first switch 306 provides sample and hold functionality and a second switch 308 provides read out functionality for a charge amplifier circuit 310. In the illustrated embodiment, an output line 309 is shared by many pixels in a column, e.g., 1024 pixels in a column.

In an exemplary embodiment, the charge amplifier circuit 310 includes a charge amplifier 312 with an adjustable gain 314 to receive a charge mode readout and provide an output signal to a sample/hold circuit 316. In one embodiment, the sample/hold circuit 316 includes an odd row sample and hold 318 and an even row sample and hold 320. Outputs of the sample and hold circuits 318, 320 are provided to an output stage 322, which includes a multiplexer circuit 324, such as a 64-to-1 column multiplexer, to output the aggregated signal data 326. In one embodiment, there are four event indicator outputs per FPA.

Figure 4:
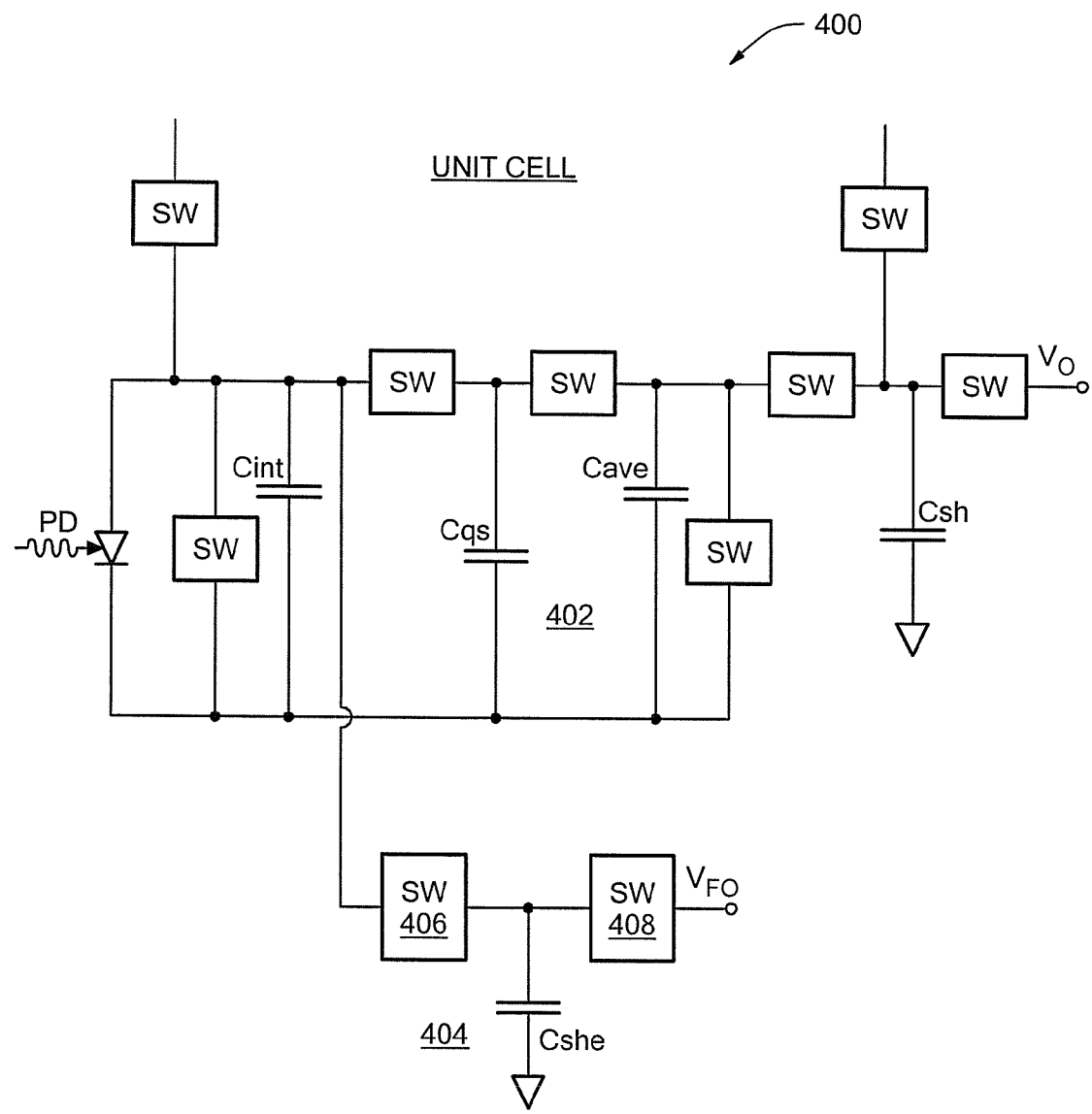
FIG. 4 is a exemplary circuit diagram showing pixel-based circuitry.

FIG. 4 shows an exemplary pixel circuitry unit cell 400 to provide pixel-level signals for the FPA including the higher resolution imagery, lower frame rate signal path 402 and the lower resolution aggregated, higher frame rate signal path 404.

The pixel circuit includes a photodetector PD for one row and one column of an array. The unit cells are connected to an associated column amplifier, such as of type shown in charge amplifier circuit 310 of FIG. 3. The unit cell 400 includes an integration capacitor Cint, a sample and hold capacitor Csh, and a charge averaging capacitor Cave and a series of switches SW to control operation and sampling of the capacitors. A voltage sampling capacitor Cqs is also provided to implement the subframe averager low-pass filter function for the high resolution, low frame rate pixel signals.

The charge for each pixel is integrated within each unit cell. The subframe averaged output Vo enhances the dynamic range of the high resolution pixel signals. The integration process begins as the charge converted by the photodetector PD is integrated across the integration capacitor Cint during each subframe period. It is understood that there are n subframes within one frame. At the end of a subframe period, the switches effectuate the transfer of the charge photogenerated in the photodetector PD from the integration capacitor Cint to the charge averaging capacitor Cave. The charge integrated across the integration capacitor Cint is passed across the sample and hold capacitor Csh. Once the charge is passed to the sample and hold capacitor Csh, the integration capacitor Cint is reset, and a new high resolution signal is built up on Cave over multiple subframes while the data on Csh is read out from the pixels to the FPA output.

At the beginning of the next subframe, the next charge photogenerated in the photodetector PD is integrated across the integration capacitor Cint. The end of the subframe effectuates the transfer of the next charge photogenerated in the photodetector PD from the integration capacitor Cint to the charge averaging capacitor Cave. This continues for each subframe period as incident radiation received by the photodetector is repetitively sampled. It is noted that during the subframe periods the charge across the charge averaging capacitor Cave is not reset. As a result, charge is averaged and held on the charge averaging capacitor Cave. At the conclusion of the n subframe periods, the signal on Cave is transferred to Csh and then each row and column of the FPA is readout.

The event indicator (aggregation) circuit 404 includes a sampling switch 406 to transfer charge on a subframe basis to an event indicator integration and sample/hold capacitor Cshe. In one embodiment, there is one event indicator integration and sample/hold capacitor Cshe for each group of neighboring pixels, such as the 4×4 superpixel SP of FIG. 2. The event indicator sample/hold capacitor Cshe integrates the subframe charge for charge mode output to a column charge amplifier under the control of a charge readout switch 408. The output of the event indicator circuit 404 is normally at the subframe rate.

In an exemplary embodiment, the subframe and event indicator integration times are independently adjustable. In one embodiment, the first ten percent of the subframe is event indicator integration and sample/hold, and the remaining ninety percent is subframe average (SFA) integration.

Referring again to FIG. 1, in one embodiment the display 106 shows only the high resolution imagery for observation by a user. The lower resolution, higher frame rate information is processed by a computer to identify events of interest, such as pulsed light. It is understood that identifying objects of interest in a video stream is well known to one of ordinary skill in the art. In other embodiments, locations generating the pulsed light detected by the computer are indicated on the display 106. In one particular embodiment, the locations of pulsed light or other detected event are passed to a weapon system.

Figure 5:
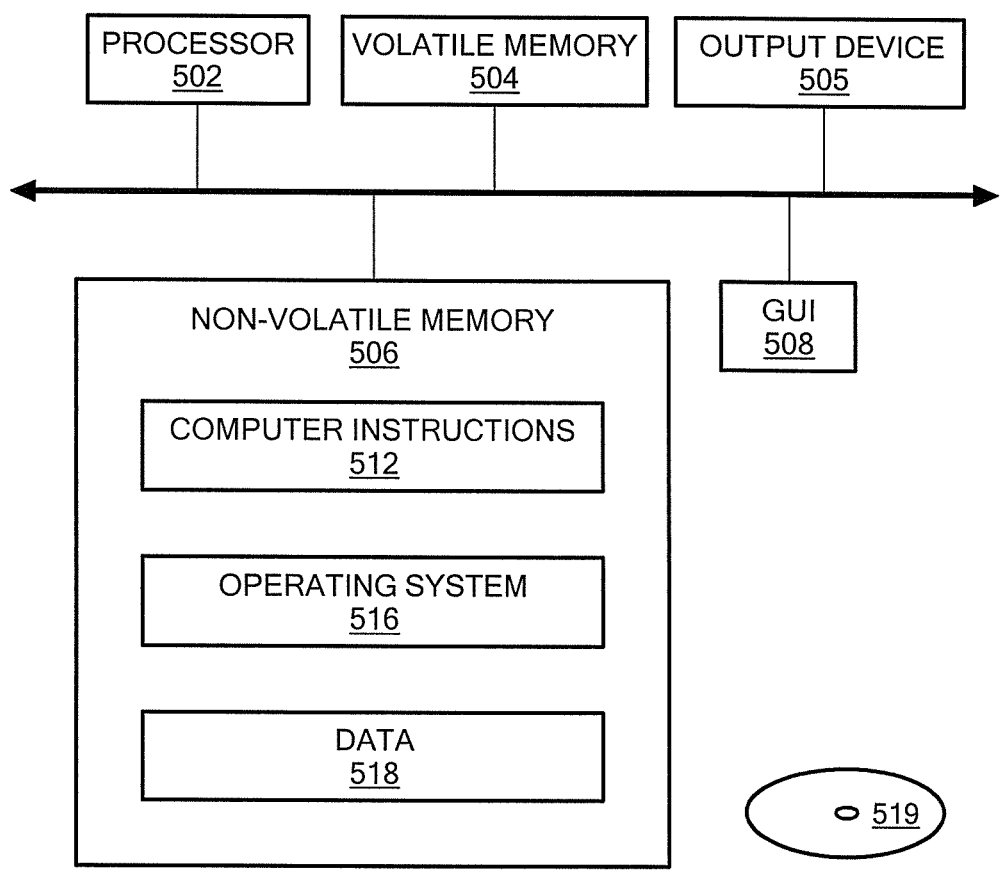
FIG. 5 is a schematic diagram of an exemplary computer to processing information from the sensor system of FIG. 1.

Referring to FIG. 5, a computer includes a processor 502, a volatile memory 504, an output device 505, a non-volatile memory 506 (e.g., hard disk), and a graphical user interface (GUI) 508 (e.g., a mouse, a keyboard, a display, for example). The non-volatile memory 506 stores computer instructions 512, an operating system 516 and data 518, for example. In one example, the computer instructions 512 are executed by the processor 502 out of volatile memory 504 to perform all or part of the processing described above. An article 519 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

Exemplary embodiments of the invention provide a sensor system to use high-frequency signal samples of a subframe averager, together with aggregation of these signals for multiple neighboring pixels, and read out both SFA-processed full resolution signals and aggregated event indicator signals. This arrangement achieves a two-in-one sensor that simultaneously provides a conventional high-resolution moderate frame rate imaging function, as well as a lower-resolution high frame rate imaging function for detecting and classifying relatively fast transient events in a scene, such as pulsed light. As used herein, it is understood that the term pulsed does not require any periodicity, i.e., the pulses can be random in time and of relatively short duration. It is further understood that short duration is a relative term. For example, a muzzle flash is short with respect to a human being able to visually perceive it. However, a muzzle flash could be relatively long in other contexts.

While the invention is primarily shown and described in conjunction with detecting pulsed light events, such as muzzle flashes, it is understood that a wide variety of events can be detected by processing the lower resolution, higher frame rate information. As noted above, the frame rate can vary to detect events having particular frequencies and frequency ranges. In addition, the characteristics of the event can vary, such as by color, wavelength, sensor type, sensor data, patterns, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of processing data from a sensor, comprising:
   processing data from a first pixel in a plurality of pixels at a first frequency by performing subframe averaging of the first pixel data over a first number of subframes to generate a first data stream at a first frame rate and a first resolution;
   outputting the first data stream for viewing by a user;
   aggregating data from at least two neighboring pixels to form aggregate pixel data which is read out at a subframe rate; and
   integrating the aggregate pixel data and outputting the integrated aggregate pixel data at a second frequency higher than the first frequency to generate a second data stream simultaneously with the first data stream, the second data stream having a second resolution less than the first resolution and a second frame rate greater than the first frame rate.

2. The method according to claim 1, further including processing the second data stream to identify an event of interest.

3. The method according to claim 2, wherein the event of interest is pulsing light.

4. The method according to claim 2, wherein the event of interest is muzzle flash.

5. The method according to claim 1, wherein integration times for the aggregate pixel data and the first pixel data are independently adjustable.

6. The method according to claim 1, wherein the sensor is a focal plane array.

7. The method according to claim 1, wherein the sensor is secured to a vehicle.

8. The method according to claim 7, wherein the vehicle comprises a helicopter.

9. The method according to claim 1, further comprising integrating the aggregate pixel data on a first capacitor.

10. A sensor system, comprising:
    a first signal path circuit to process data from a first pixel in a plurality of pixels at a first frequency by performing subframe averaging of the first pixel data over a first number of subframes to generate a first data stream at a first frame rate and a first resolution;
    a first output to output the first data stream for viewing by a user;
    a second signal path circuit to aggregate data from at least two neighboring pixels to form aggregate pixel data at a subframe rate and integrate the aggregate pixel data; and
    a second output to output the integrated aggregate pixel data at a second frequency higher than the first frequency as a second data stream provided simultaneously with the first data stream, the second data stream having a second resolution less than the first resolution and a second frame rate greater than the first frame rate.

11. The system according to claim 10, further including a processor to process the second data stream to identify an event of interest.

12. The system according to claim 11, wherein the event of interest is pulsing light.

13. The system according to claim 11, wherein the event of interest is muzzle flash.

14. The system according to claim 10, wherein integration times for the aggregate pixel data and the first pixel data are independently adjustable.

15. The system according to claim 10, wherein the sensor system comprises a focal plane array.

16. The system according to claim 10, wherein the sensor system is secured to a vehicle.

17. The system according to claim 16, wherein the vehicle comprises a helicopter.

18. The system according to claim 10, wherein the aggregate pixel data is integrated on a first capacitor.

19. A sensor system including a sensor to obtain data, comprising:
   a first means to process data from a first pixel in a plurality of pixels to generate a first data stream at a first frame rate and a first resolution;
   a second means to aggregate data from at least two neighboring pixels to form aggregate pixel data at a subframe rate to generate a second data stream having a second resolution less than the first resolution and a second frame rate greater than the first frame rate.

20. The sensor system according to claim 19, further including a third means to process the second data stream to identify an event of interest.

\* \* \* \* \*